(12) United States Patent
Schwarz et al.

(10) Patent No.: US 7,824,151 B2
(45) Date of Patent: Nov. 2, 2010

(54) ZERO RUNNING CLEARANCE CENTRIFUGAL COMPRESSOR

(75) Inventors: Frederick M. Schwarz, Glastonbury, CT (US); Jesse W. Smith, Seneca, SC (US)

(73) Assignee: United Technologies Corporation, Hartford, CT (US)

(*) Notice: Subject to any disclaimer, the term of this patent is extended or adjusted under 35 U.S.C. 154(b) by 899 days.

(21) Appl. No.: 11/635,123

(22) Filed: Dec. 6, 2006

(65) Prior Publication Data
US 2008/0134659 A1 Jun. 12, 2008

(51) Int. Cl.
*F01D 7/00* (2006.01)
*F04D 29/18* (2006.01)
*F02C 6/00* (2006.01)

(52) U.S. Cl. .................. 415/131; 415/173.2; 60/803
(58) Field of Classification Search .............. 60/726, 60/802, 803, 805; 415/126, 131, 132, 127
See application file for complete search history.

(56) References Cited

U.S. PATENT DOCUMENTS

| 2,977,758 | A | * | 4/1961 | Haworth et al. | 60/796 |
| 3,045,894 | A | * | 7/1962 | Ross | 415/131 |
| 5,263,816 | A | * | 11/1993 | Weimer et al. | 415/131 |
| 6,058,791 | A | * | 5/2000 | Brunet | 74/15.63 |
| 6,273,671 | B1 | * | 8/2001 | Ress, Jr. | 415/1 |
| 6,692,222 | B2 | * | 2/2004 | Prinz et al. | 415/14 |
| 2006/0122798 | A1 | * | 6/2006 | Teolis et al. | 702/66 |
| 2007/0043497 | A1 | * | 2/2007 | Leogrande et al. | 701/100 |

* cited by examiner

*Primary Examiner*—Michael Cuff
*Assistant Examiner*—Gerald L Sung
(74) *Attorney, Agent, or Firm*—Bachman & LaPointe, P.C.

(57) ABSTRACT

A turbine engine includes an engine housing enclosing: a centrifugal compressor having a rotor; at least one centrifugal compressor bore mounted to the rotor; at least one blade mounted to each of the at least one centrifugal bore and disposed proximate to at least one static wall; a turbine disposed in connection with the centrifugal compressor; a thrust bearing disposed in connection with the rotor; and means for moving said rotor with reference to the at least one static wall attached to the thrust bearing.

14 Claims, 7 Drawing Sheets

ZERO RUNNING CLEARANCE CENTRIFUGAL COMPRESSOR

FIELD OF THE INVENTION

The invention relates to compressors and, more particularly, relates to centrifugal compressors with minimized running clearances.

BACKGROUND OF THE INVENTION

Many personal, commercial, and military aircraft are powered by gas turbine engines. Gas turbine engines are also used to provide ground-based power for many applications that include ground vehicle power, electrical power generation, and pumping of various liquids and gases. All these gas turbines employ compressors of two main types, that is, (1) axial compressors and (2) centrifugal compressors. Centrifugal compressors turn airflow perpendicular to the axis of rotation. Centrifugal compressors do work on the airflow by accelerating the flow to the higher blade velocity that occurs at the outer diameter of each blade.

Referring now to FIGS. 1A and 1B, a single stage centrifugal compressor and a multi-stage centrifugal compressor are shown. Generally, centrifugal compressor performance is characterized by the pressure ratio across the compressor, the rate at which air or other gases are pumped through the compressor, and an efficiency factor that indicates how much additional work is required relative to an ideal compressor.

Referring now to FIG. 2, a gas turbine engine 10 equipped with a single stage centrifugal compressor 12, without any axial compressor stages on its shaft, that is turned by a single stage turbine 14 is shown. During operation, both the static structures and rotating structures of the centrifugal compressor 12 move. The relative motions of the static structures alone cause the static wall to move away and toward the rotating blades. In addition, the deflections of the structures caused by pressure, radial and axial thermal expansion, and radial and axial tolerance stack-ups lead to open compressor clearances. The pressure deflections in absolute terms relative to a reference point within the compressor tend to be at their maximum at take-off power or a maximum power condition in flight. However, absolute maximum deflection alone does not set the contour of the static structure adjacent to the rotor. The contour is set by another significant mismatch between the contour of the static wall and the rotating blades which arises from the different rates of thermal expansion of the rotor and the static wall parts. The worst-case scenario that exaggerates the effect of the thermal mismatch is when a "hot-reburst" occurs. A hot-reburst is a sequence where high power is set for a long time, followed by a critical low-power period-and then an acceleration back-to-high-power is performed. This circumstance will set the contours of the rotating and static structure and the magnitude of the mismatch relative to steady state mid-power such that at mid-power there is a significant mismatch between the two walls.

FIG. 3 illustrates a cold build clearance 16 between a static wall contour 18 and a rotor blade 20 of the centrifugal compressor 12. When the turbine engine is not operating, the static wall contour 18 and rotating blade contour 20 do not match. These static and rotating contours 18, 20 and the cold build clearance 16 between them are configured so that the static and rotating contours (18 and 20) will coincide (within some margin to accommodate manufacturing variations and prevent rub) at the most severe transient "pinch point" condition. Thus, a perfect matching of the contours of the rotor blades and the static structures 18, 20 for cruise or a mid-power condition is not possible because the hot re-burst transient condition sets the contour and the minimum clearance between the static structure and rotating structure. FIG. 4 shows the static structure contour 18 with respect to the rotating structure contour 20 at a transient minimum state ("hot re-burst") 22, a steady state ("cruise") 24, and a transient maximum state ("decel") 26. The dotted lines of the hot re-burst 22 and decel 26 indicate a shifting static structure moving forward and aft, inward and outward, all at different rates than the rotating structure contour which is a fixed reference for purposes of explanation. It is important to note that the cruise contour 24 falls within the hot re-burst 22 and decel 26 and therefore can never be perfectly matched to the rotor.

Therefore, there exists a need to compensate for the relative motion of both the static structures and rotating structures and maintain a minimum clearance between the static structures and rotating structures during steady state and transient operation.

SUMMARY OF THE INVENTION

In accordance with the present invention, a turbine engine broadly comprising an engine housing enclosing: a centrifugal compressor including: a rotor; at least one centrifugal compressor bore mounted to the rotor; at least one blade mounted to each of the at least one centrifugal bore and disposed proximate to at least one static wall; a turbine disposed in connection with the centrifugal compressor; a thrust bearing disposed in connection with the rotor; and means for moving the rotor with reference to the at least one static wall attached to the thrust bearing.

In accordance with another aspect of the present invention, a process for generating a zero running clearance in a centrifugal compressor of a turbine engine broadly comprising the steps of providing a centrifugal compressor having a clearance between at least one blade of a rotor of the centrifugal compressor and at least one static wall disposed proximate to the at least one blade; operating a turbine engine at a steady state operating efficiency; decelerating the turbine engine to a transient maximum state from the steady state or a transient minimum state; rebursting the turbine engine to the transient minimum state from the steady state or the transient maximum state; and adjusting the clearance in response to the deceleration or the reburst to maintain the steady state operating efficiency.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 5:
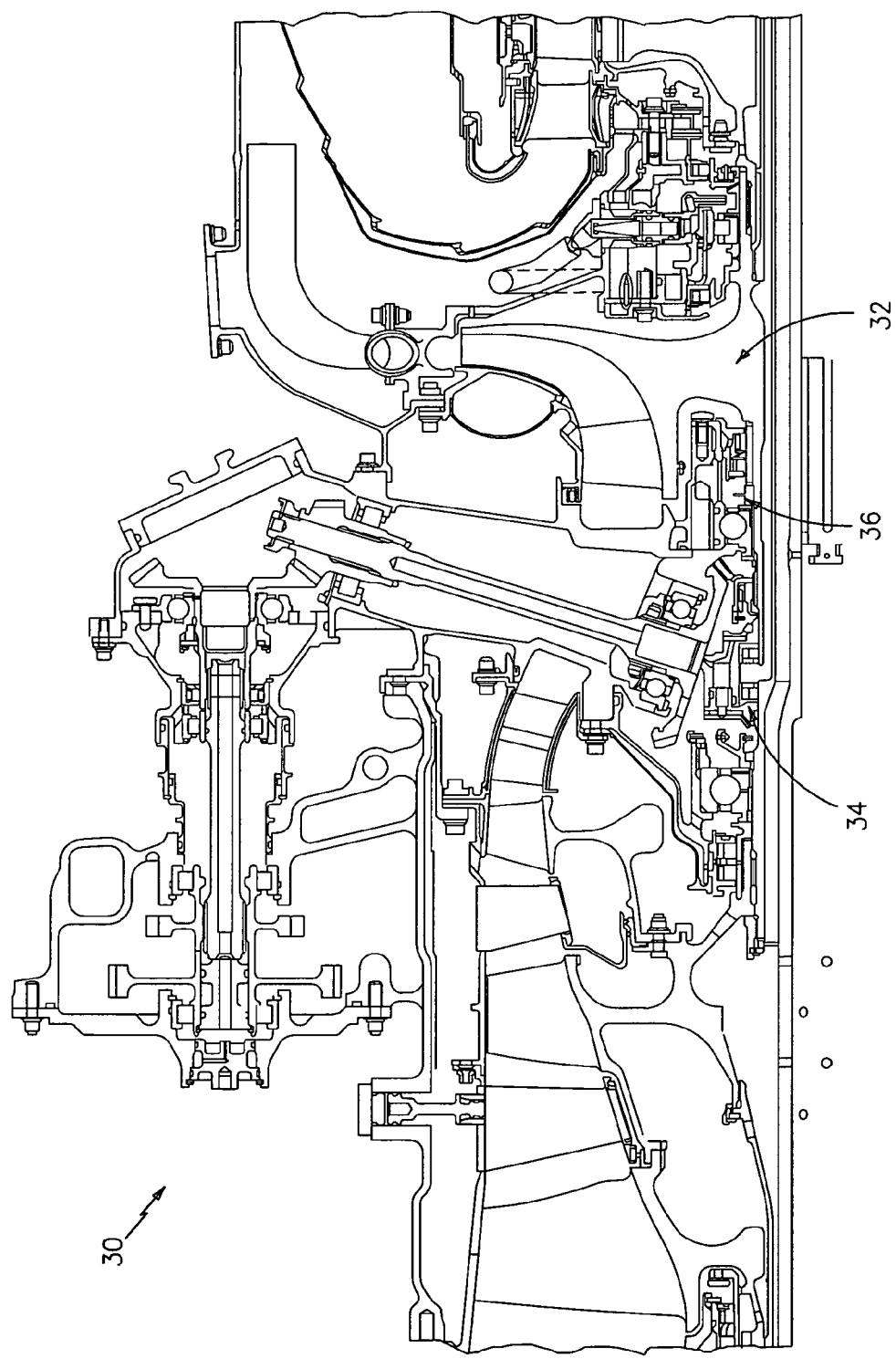
FIG. 5 is a representation of a cross-sectional view of a gas turbine engine equipped with a zero running clearance centrifugal compressor, a tower shaft engagement device and a rotor shift device of the present invention.

FIG. 5 illustrates a cross-sectional view of a gas turbine engine 30 equipped with a zero running clearance centrifugal compressor 32, a tower shaft engagement device 34 and a rotor shift device 36. The tower shaft engagement device 34 keeps the tower shaft properly engaged to the main rotor shaft attached to compressor 32. The tower shaft powers the gear box, hydraulic pumps, fuel pumps, and other engine components as known to one of ordinary skill in the art. The rotor shift device 36 moves the rotor of the centrifugal compressor axially. The tower shaft engagement device 34 accommodates this axial motion to maintain proper engagement of the gears connecting the main rotor shaft and the tower shaft. This tower shaft engagement device may be an active device or may be a passive design solution as known to one of ordinary skill in the art.

Figure 6:
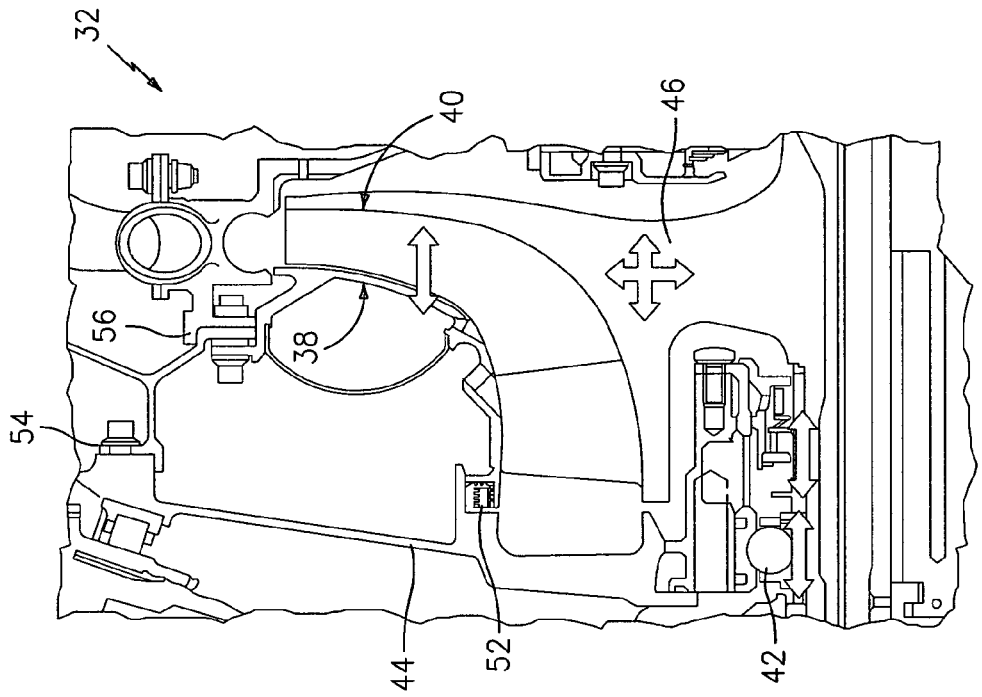
FIG. 6 is a representation of the movement of the static structures with respect to the rotating structures within the centrifugal compressor of FIG. 5.

Referring now to FIG. 6, the static structures and rotating structures of the centrifugal compressor 32 are shown. The arrows shown in FIG. 6 indicate the relative motions of the static structures alone that cause a first static wall 38 to move away and toward a rotating blade 40. The double-headed arrows describe the effects of pressure deflection, radial and axial thermal expansion, and radial and axial tolerance stackups that lead up to open compressor clearances. The pressure deflections in absolute terms, relative to a ball bearing 42 as a reference point, tend to be at their maximum at maximum power for the engine operating condition with maximum engine inlet pressure, e.g., ambient pressure for ground based gas turbines, sea level pressure for many aircraft gas turbines.

Figure 7:
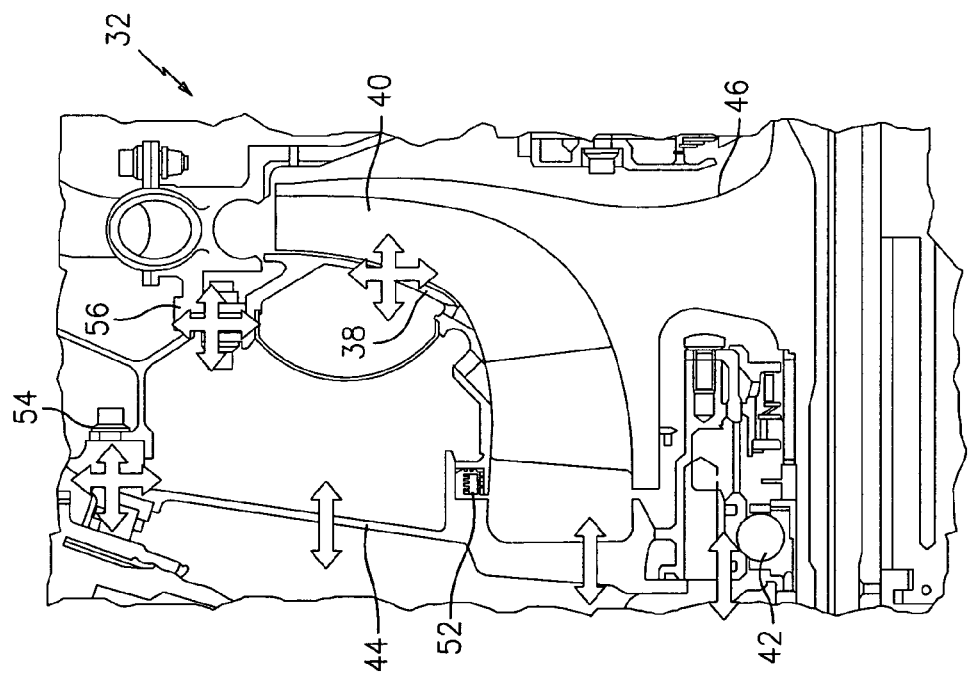
FIG. 7 is a representation of the movement of the rotating structures with respect to the static structures within the centrifugal compressor of FIG. 5.

Referring to FIG. 7, the static structures and rotating structures of the centrifugal compressor 32 are shown again. In this representation, the arrows shown indicate the relative motions of the rotating structure alone. These arrows described the effects of radial and axial tolerance stack up, transient thermal expansion and contraction, and pressure deflection leading to open compressor clearances.

Figure 8:
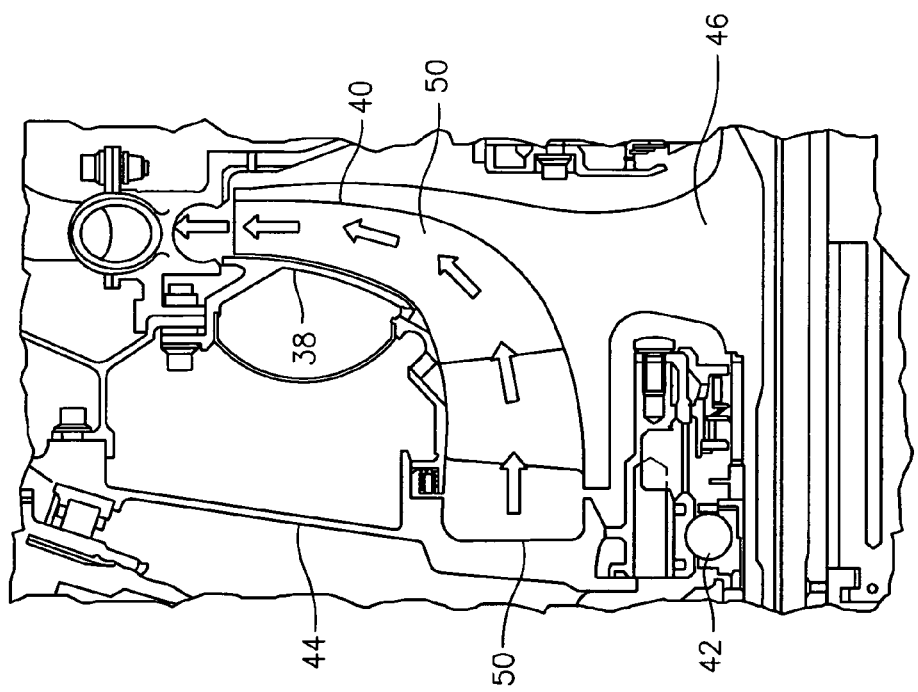
FIG. 8 is representation of the compressor flow path of the centrifugal compressor of FIG. 5.

FIG. 8 illustrates a compressor flow path 50 of the zero running clearance centrifugal compressor 32. The static wall 38, thrust bearing 42, static structure wall 44, and a centrifugal compressor bore 46 are all experiencing radial and axial thermal expansion and pressure deflections. There will be a gross accumulation of movement starting at the thrust bearing 42 that is exhibited by the innermost static wall 44. A W-seal 52 disposed between and in contact with both the innermost static wall 44 and static wall 38 allows for the thermal expansion and axial movement of the innermost static wall 44 with respect to the static wall 38. The accumulated thermal expansion and pressure deflection is so great that the static wall 38 constantly expands. While the static wall 38 is bolted at flanges 54 and 56, the W-seal 52 permits the static wall 38 to expand in the direction of the arrows shown in FIG. 6 so that stress does not build up. Without the W-seal 52, the static wall 38 would either need to be restrained or permitted to move freely. If restrained, a greater amount of stress would build up. In contrast, if permitted to move freely, the static wall 38 and flanges 54 and 56 would build up more movement and interfere with the rotating structures, that is, the rotating blade 40.

Figure 1A:
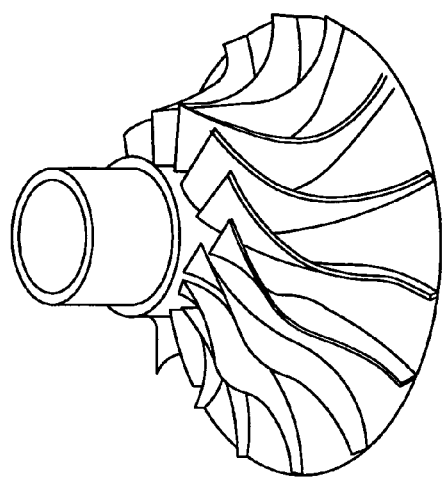
FIG. 1A is a representation of a single stage centrifugal compressor of the prior art.
Figure 1A:
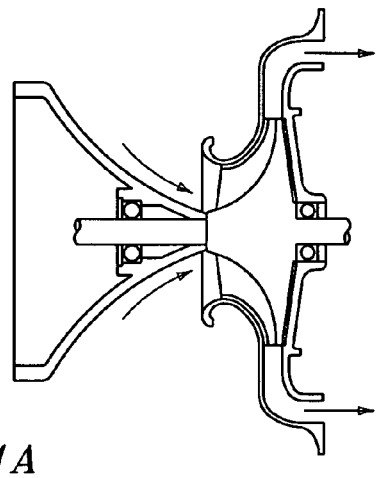
Figure 1B:
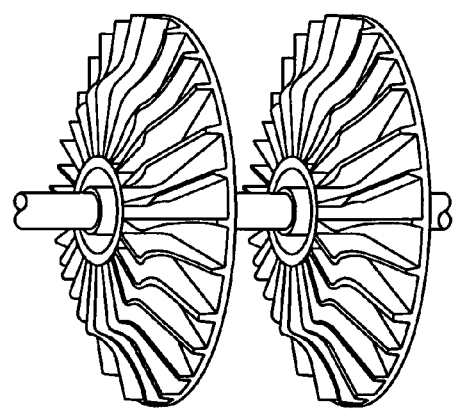
FIG. 1B is a representation of a multi-stage centrifugal compressor of the prior art.
Figure 1B:
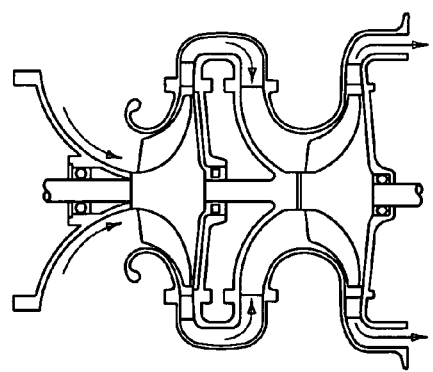
Figure 2:
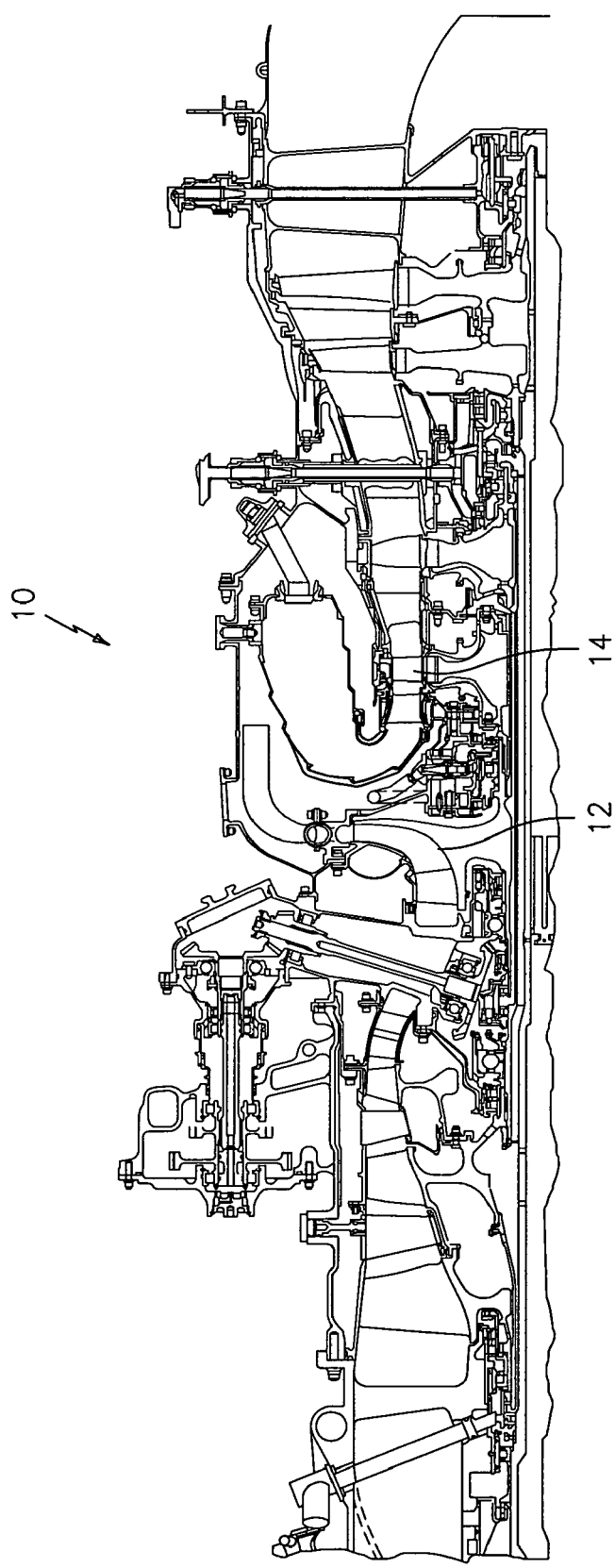
FIG. 2 is a representation of a cross-sectional view of a gas turbine engine equipped with a centrifugal compressor turned by a single stage turbine of the prior art.
Figure 4:
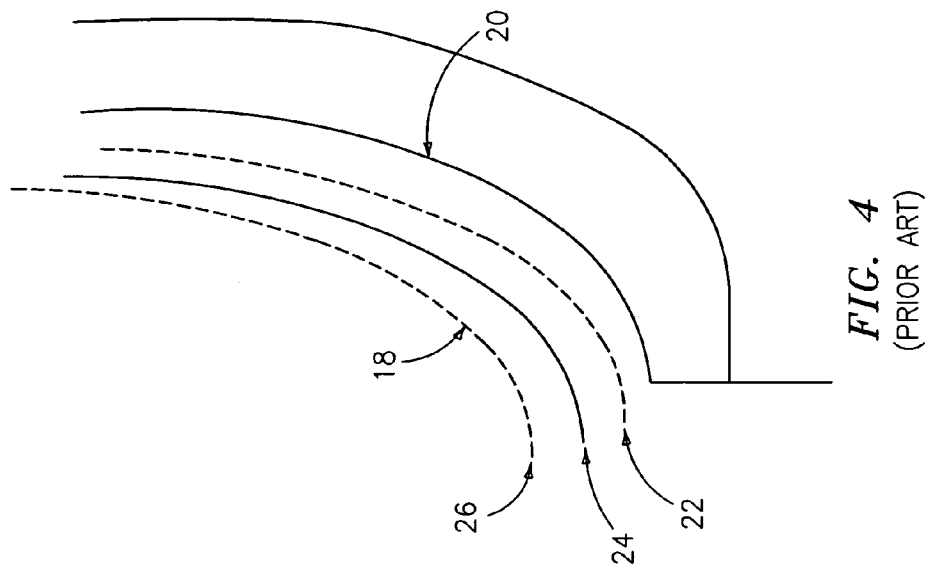
FIG. 4 is a representation of the static structure contour with respect to the rotating structure contour at various operating states of the gas turbine engine of the prior art.
Figure 3:
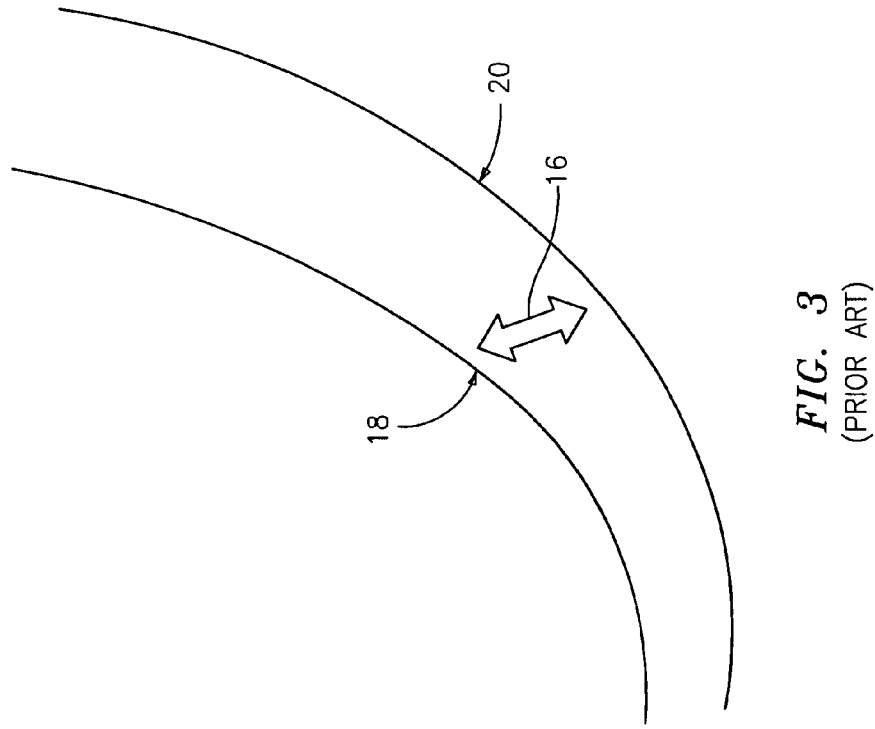
FIG. 3 is a representation of a cold build clearance between a static structure contour and a rotating structure contour of the centrifugal compressor of the prior art.

As mentioned earlier in FIG. 4, the axial and radial movements of the static wall 38 with respect to the rotating blade 40 are mismatched. For purposes of explanation, the rotating blade 40 is fixed as a reference to illustrate how the static wall 38 moves with reference to the rotating blade 40. The transient extremes, that is, the transient minimum 22 and transient maximum 26, around the steady state 24 represent the extremes of motion of the static wall 38. When the zero running clearance centrifugal compressor 32 is not employed, any point chosen on the transient maximum reflects the fact that the rotating blade 40 has not cooled as much as the static wall 38 due to the difference in their respective thicknesses. When the turbine engine 30 is reactivated or experiences a re-burst during operation, the static wall 38 will achieve the maximum interference represented by the transient minimum 22.

Figure 9:
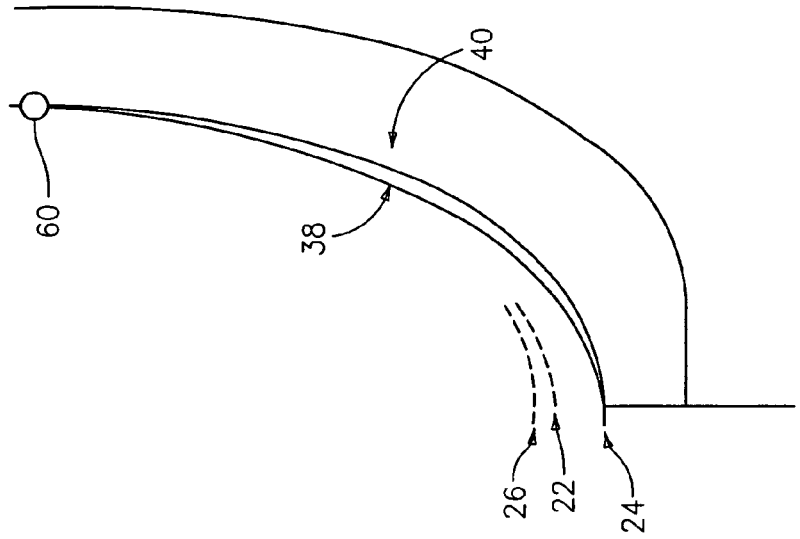
FIG. 9 is a representation of a static structure contour with respect to a rotating structure contour at a various operating states of a gas turbine engine equipped with a zero running clearance centrifugal compressor of the present invention.

Referring now to FIG. 9, the zero running clearance centrifugal compressor 32 in conjunction with the tower shaft engagement device 34, rotor shift device 36, and optionally a sensor 60 that work together with an engine control computer to allow a positioning of the rotor that best matches the contour of the static wall 38. The objective of the shifting of the rotor relative to the static wall is to maintain the minimum clearance possible while preventing rub of the rotating and static structures. The rotor shift device 36 at the thrust bearing 42 shifts the rotating structure under the command of the electronic engine control. The minimum steady state clearance between rotating blade 40 and static wall 38 may then be achieved as shown in FIG. 9. Operation of the centrifugal compressor 32 at the steady state condition 24 shown in FIG. 9 provides the most efficient operation possible while preventing rub.

When employed, the optional sensor 60 may track the clearance present between the static wall 38 and rotating blade 40 at any selected location or at multiple locations. The optional sensor 60 may be any sensor capable of monitoring the position of the static wall 38 with respect to the rotating blade 40. For example, a microwave sensor may be utilized that is programmed with an algorithm to act as a conditioning circuit and works in conjunction with the electronic engine controller (not shown) of the gas turbine engine 30. The control logic of the algorithm will execute and implement the mechanics behind opening and minimizing the clearance to the extent possible using the rotor shift device 36. The rotor shift device will move the thrust bearing assembly axially, that is, thrust bearing 42, and in turn the rotating blade 40 with respect to the static wall 38. It is important to note that one skilled in the art may produce an axial shift mechanism that by hydraulic pressure or mechanical means can shift the rotor from one position to another in an amount of time that is less than the time necessary to accelerate the engine from low power to maximum power. In this way the rotor shifting can precede the engine transients entirely and the maximum benefit can be realized from the optimally contoured rotor and adjacent wall structure.

Figure 10:
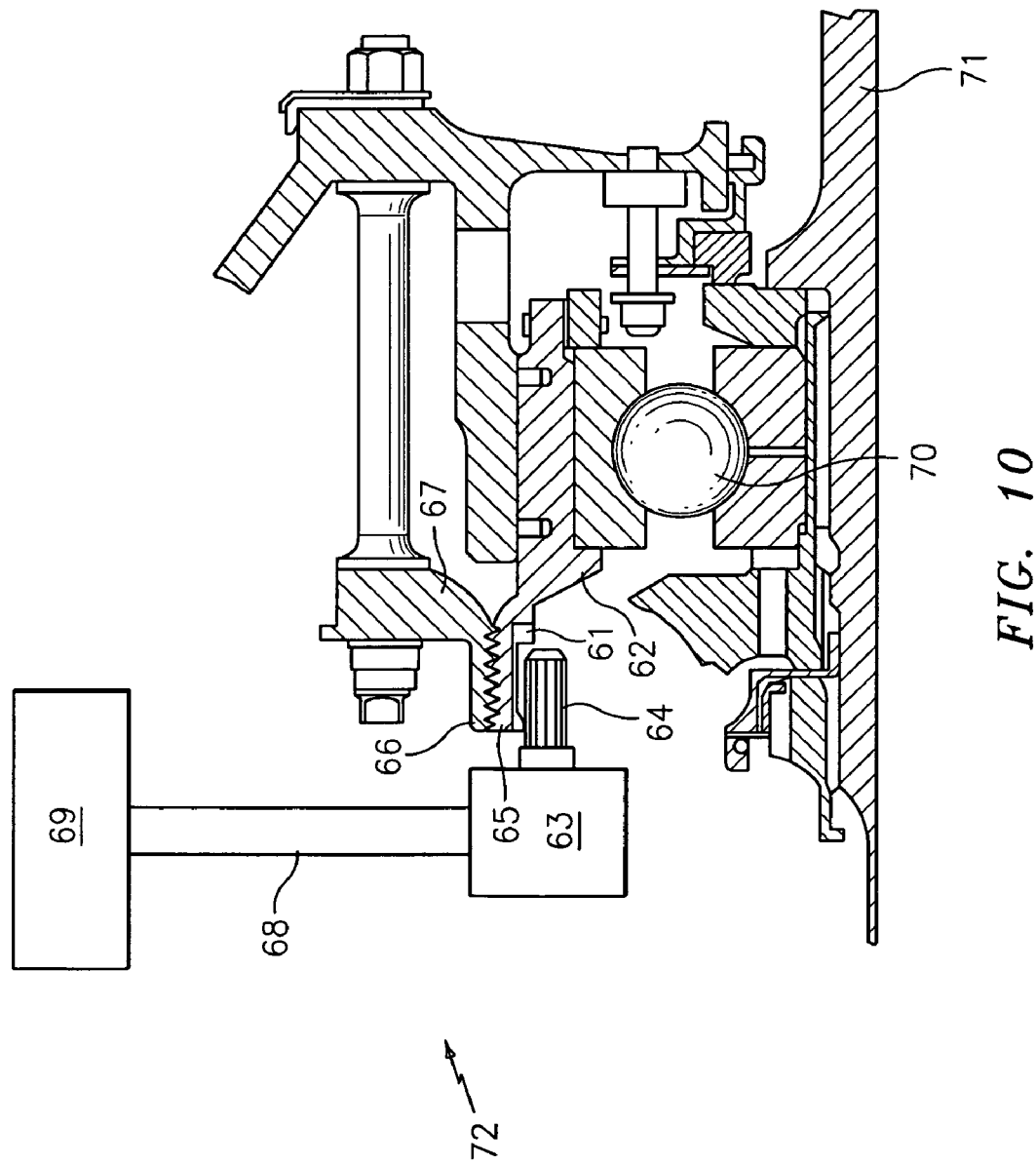
FIG. 10 is a representation of an alternative rotor shift device for the gas turbine engine of FIG. 5.

The zero running clearance centrifugal compressor of the present invention permits the gap between the rotor and the static structure to be held to a minimum clearance during steady state and transient operation by shifting the rotor axially to compensate for the relative motion of both rotating and static parts. The clearance adjustment improves both compressor efficiency and stability. The rotor shift device at the thrust bearing shifts the rotating structure under the command of the electronic engine control and the optional sensor is capable of continuously reading the clearance between the rotor and the static structure FIG. 10 illustrates one of many possible alternative mechanisms for the rotor shift device 36 that achieves the desired axial rotor shift. This alternative includes a spur gear 61 attached to a bearing mount 62. The gear arrangement 63 includes a gear 64 for engaging the spur gear 61 attached to the bearing mount 62. The bearing mount 62 also has a screw thread portion 65 that mates with a screw thread portion 66 of the casing 67. Rotation of shaft 68 via the motor 69, causes the bearing mount 62 to rotate relative to the casing 67. The screw thread engagement between the casing 67 and the bearing mount 62 causes the rotating bearing mount 61 to travel axially. As a result, the main shaft bearing 70 and attached centrifugal rotor assembly 71 travel axially as well.

The above-described actuation system 72, gear arrangement 63, and actuation motor 69 is one example of how the axial movement of the centrifugal rotor assembly 71 can be accomplished. However, as one of ordinary skill in the art will recognize, the present invention is not limited to this example described herein.

One or more embodiments of the present invention have been described. Nevertheless, it will be understood that various modifications may be made without departing from the spirit and scope of the invention. Accordingly, other embodiments are within the scope of the following claims.

What is claimed is:

1. A turbine engine, comprising:
an engine housing enclosing:
a centrifugal compressor including:
a rotor;
at least one centrifugal compressor bore mounted to said rotor;
at least one blade mounted to each of said at least one centrifugal bore and disposed proximate to at least one static wall;
a turbine disposed in connection with said centrifugal compressor;
an innermost static wall;
a seal disposed between and in contact with the innermost static wall and said at least one static wall for allowing thermal expansion and axial movement of the innermost static wall with respect to the at least one static wall;
a thrust bearing disposed in connection with said rotor; and
means for moving said rotor with reference to said at least one static wall attached to said thrust bearing, said means for moving said rotor comprising a first gear attached to a bearing mount, a second gear for engaging the first gear, and means for driving the second gear.

2. The turbine engine of claim 1, wherein said at least one blade is disposed proximate to a first static wall.

3. The turbine engine of claim 1, wherein said means for moving said rotor comprises a rotor shifting apparatus.

4. The turbine engine of claim 1, further comprising a tower shaft disposed in connection with a rotor shaft of said rotor, and a tower shaft engagement device disposed in connection with said tower shaft.

5. The turbine engine of claim 1, wherein a first end of said thrust bearing is connected to the innermost static wall and a second end of said thrust bearing is connected to said rotor.

6. The turbine engine of claim 1, further comprising a sensor mounted to said at least one static wall and disposed proximate to said at least one blade.

7. The turbine engine of claim 1, further comprising an electronic engine controller.

8. The turbine engine of claim 1, further comprising an electronic engine controller disposed in communication with a sensor mounted to said at least one static wall and disposed proximate to said at least one blade.

9. The turbine engine of claim 1, wherein said means for moving said rotor further comprises means for moving said rotor axially with reference to said at least one static wall.

10. The turbine engine of claim 1, wherein said second gear driving means comprises a gear arrangement, a motor, and a shaft connecting said motor to said gear arrangement.

11. The turbine engine of claim 1, wherein said bearing mount has a screw thread portion which mates with a screw thread portion of a casing.

12. The turbine engine of claim 1, wherein said first gear is a spur gear.

13. The turbine engine of claim 1, wherein said seal is a W-seal.

14. The turbine engine of claim 6, wherein said sensor is a microwave sensor programmed with an algorithm to act as a conditioning circuit.

* * * * *